(12) United States Patent
Sasada (10) Patent No.: US 7,366,358 B2
(45) Date of Patent: Apr. 29, 2008

(54) METHOD OF AND SYSTEM FOR GENERATING IMAGE SIGNAL

(75) Inventor: Ryoji Sasada, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 468 days.

(21) Appl. No.: 10/170,351

(22) Filed: Jun. 14, 2002

(65) Prior Publication Data

US 2002/0196985 A1   Dec. 26, 2002

(30) Foreign Application Priority Data

Jun. 21, 2001  (JP)  ............... 2001-187902

(51) Int. Cl.
  *G06K 9/40*  (2006.01)
(52) U.S. Cl. ..................... 382/269; 345/611
(58) Field of Classification Search ................ 382/269, 382/260, 100, 128, 132; 359/326; 348/392.1; 345/611
  See application file for complete search history.

(56) References Cited

U.S. PATENT DOCUMENTS

| | | | |
|---|---|---|---|
| 3,783,282 A * | 1/1974 | Hoppenstein | ................. 378/41 |
| 4,258,264 A | 3/1981 | Kotera et al. | |
| 4,276,473 A | 6/1981 | Kato et al. | |
| 4,315,318 A | 2/1982 | Kato et al. | |
| 4,718,104 A * | 1/1988 | Anderson | .................. 382/240 |
| 4,987,496 A * | 1/1991 | Greivenkamp, Jr. | ........ 358/448 |
| 5,021,327 A * | 6/1991 | Bunch et al. | ................ 430/496 |
| 5,028,784 A * | 7/1991 | Arakawa et al. | ............ 250/584 |
| 5,572,608 A * | 11/1996 | Edgar | ......................... 382/321 |
| 5,621,519 A * | 4/1997 | Frost et al. | .............. 356/124.5 |
| 5,881,162 A * | 3/1999 | Ishimitsu | ..................... 382/132 |
| 6,326,786 B1 * | 12/2001 | Pruessmann et al. | ....... 324/312 |
| 6,515,699 B2 * | 2/2003 | Tanji et al. | ................. 348/254 |

FOREIGN PATENT DOCUMENTS

| | | |
|---|---|---|
| EP | 1 202 555 A2 | 2/2002 |
| JP | 55-012429 | 1/1980 |
| JP | 55-116340 | 9/1980 |
| JP | 55-163472 | 12/1980 |
| JP | 56-11395 | 2/1981 |
| JP | 56-164645 | 12/1981 |
| JP | 3-114039 | 5/1991 |
| JP | 2000-257668 | 9/2000 |

* cited by examiner

*Primary Examiner*—Daniel Miriam
*Assistant Examiner*—Dennis Rosario
(74) *Attorney, Agent, or Firm*—Sughrue Mion, PLLC (57) ABSTRACT

An original image including therein a predetermined periodic pattern is read out by sampling the original image at a frequency higher than a desired sampling frequency, and an initial image signal is thus obtained. The initial image signal is then re-sampled at the desired sampling frequency to generate a final image signal. The final image signal is generated so that the aliasing distortion components due to the predetermined periodic pattern come to be of a frequency not lower than a predetermined frequency.

15 Claims, 11 Drawing Sheets

METHOD OF AND SYSTEM FOR GENERATING IMAGE SIGNAL

BACKGROUND OF THE INVENTION

1. Field of the Invention

This invention relates to a method of and a system for reading a recording medium on which an original image including a predetermined periodic pattern is recorded and generating an image signal.

2. Description of the Related Art

There has been put into practice in various fields an image reproduction system which outputs a reproduction image through a printer or the like on the basis of original image data obtained by reading out an original image recorded on a recording medium (photographic film, paper or the like) by the use of an image scanner or the like.

When certain kinds of phosphor are exposed to a radiation (x-rays, α-rays, β-rays, electron beams, ultraviolet rays), they store a part of energy of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". In the medical field, there has been known a radiation image recording/reproducing system in which a stimulable phosphor sheet (a sheet provided with a layer of the stimulable phosphor) is exposed to a radiation passing through an object such as a human body to have a radiation image of the object stored on the stimulable phosphor sheet, stimulating light beam such as a laser beam is caused to scan the stimulable phosphor sheet bearing thereon the radiation image of the object, the stimulated emission emitted from the stimulable phosphor sheet upon exposure to the stimulating light is photoelectrically detected, thereby obtaining a radiation image signal, and then a radiation image of the object is reproduced on the basis of the radiation image signal as a visible image on a recording medium such as a photographic film or a display such as a CRT. See, for instance, Japanese Unexamined Patent Publication Nos. 55(1980)-12429, 56(1981)-11395, 55(1980)-163472, 56(1981)164645 and 55(1980)-116340.

When recording a radiation image of an object on a recording medium such as the stimulable phosphor sheet, a grid in which linear members of a radiation-untransmissible material (a material which is very low in permeability to the radiation) such as lead and linear members of a radiation-transmissible material (a material which is high in permeability to the radiation) such as aluminum or wood are alternately arranged at fine pitches of about 4/mm is sometimes interposed between the object and the stimulable phosphor sheet in order to prevent the stimulable phosphor sheet from being exposed to the radiation scattered by the object. By the use of such a grid, exposure of the stimulable phosphor sheet to the radiation scattered by the object is suppressed and the contrast of the radiation image of the object is enhanced. However, when a radiation image including therein an image of the grid is enlarged or reduced, aliasing is caused according to the rate of enlargement or reduction. Further, if the aliasing is superposed on the spatial frequency of, for instance, a grid image, fine moiré fringes are generated, which deteriorates quality of the reproduced image.

In view of these conditions, this applicant has proposed an image signal generating method of obtaining an image signal, on the basis of which an image having less moiré fringes and less aliasing can be reproduced as disclosed in Japanese Unexamined Patent Publication No. 3(1991)-114039. However, in the image signal generating method, since a filtering processing for removing spatial frequency components of the grid image is carried out on the image signal, harmonic components of the grid image cannot be removed and moiré fringes and/or aliasing is caused due to the harmonic components of the grid image. When an image including therein an image of the grid is enlarged or reduced, further aliasing and/or moiré fringes is caused to adversely affect diagnosis. Under these conditions, this applicant has proposed an image signal generating method in which an image signal free from the aforesaid aliasing or moiré fringes is obtained by reading out an image at a sampling frequency not lower than double of the spatial frequency of the grid image, carrying out a filtering processing on the image signal to remove therefrom harmonic components of the grid image and then re-sampling the resultant image signal at a desired sampling frequency as disclosed in Japanese Patent Application 2000-257668.

However the signal generating method is disadvantageous in that it takes a long time to sampling the original image at such a fine sampling frequency and at the same time, sampling the original image at such a fine sampling frequency results in a large amount of data, which increases time required to processing the image. Further, in order to remove all the harmonic components by the filtering processing, it is necessary for the filter to have a large size so that the filter has a sharp attenuation characteristic, which adds to the cost.

Further, in the medical images, since the spatial frequency components of a part of the image necessary for diagnosis are distributed in a relatively low frequency band, existence of aliasing in a relatively high frequency components hardly involves a problem.

SUMMARY OF THE INVENTION

In view of the foregoing observations and description, the primary object of the present invention is to provide an image signal generating method and system which can generate an image signal free from moiré fringes or aliasing which can adversely affect diagnosis without adding to the cost and increasing the processing time.

In accordance with a first aspect of the present invention, there is provided an image signal generating method in which an original image including therein a predetermined periodic pattern is read out by sampling the original image at a frequency higher than a desired sampling frequency, thereby obtaining an initial image signal and the initial image signal is re-sampled at the desired sampling frequency to generate a final image signal, wherein the improvement comprises the step of generating the final image signal so that the aliasing distortion components due to the predetermined periodic pattern come to be of a frequency not lower than a predetermined frequency.

The "predetermined periodic pattern" means, for instance, a grid image when a radiation image is taken by the use of a grid and includes harmonic components generated by the predetermined periodic pattern.

All the "aliasing distortion components" theoretically generated due to the predetermined periodic pattern need not be of a frequency not lower than the predetermined frequency but only those which can interfere with observation of the image have to be of a frequency not lower than the predetermined frequency. That is, the components which are low in response and involve substantially no problem (e.g., a part smaller than 5% of very low frequency components) may be neglected.

The expression "generating the final image signal so that the aliasing distortion components due to the predetermined periodic pattern come to be of a frequency not lower than a predetermined frequency" means, for instance, "to generate the final image signal so that the aliasing distortion components due to the predetermined periodic pattern come to be of a frequency not lower than 3 cycles/mm" since the spatial frequency components of a part of a radiation image useful for diagnosis are mainly distributed in a frequency band lower than 3 cycles/mm.

This will be described in more detail, hereinbelow, taking a case where a radiation image recorded on a stimulable phosphor sheet by the use of a grid of 4/mm is read out and an image signal at 10 pixels/mm is generated for example. An analog image signal obtained by reading out an image recorded on a stimulable phosphor sheet by the use of a grid of 4/mm includes therein, in addition to a signal component of 4 cycles/mm representing an image of the grid, a second harmonic component thereof at 8 cycles/mm and a third harmonic component thereof at 12 cycles/mm (assuming that higher-order harmonic components are as small as negligible in response). Conventionally, such an analog image signal is sampled at a sampling frequency of about 40 cycles/mm (as high as double of the frequency of the highest harmonic components of the grid image or higher) not to generate aliasing distortion components due to the harmonic components. To the contrast, in accordance with the present invention, the analog image signal is sampled at a much lower sampling frequency, e.g., 15 cycles/mm. Since the Nyquist frequency is 7.5 cycles/mm at this time, the signal component of 4 cycles/mm representing an image of the grid causes an aliasing distortion component of 11 cycles/mm, the second harmonic component of 8 cycles/mm causes an aliasing distortion component of 7 cycles/mm and the third harmonic component of 12 cycles/mm causes an aliasing distortion component of 3 cycles/mm. All the aliasing distortion components are not lower than 3 cycles/mm.

In order to obtain an image signal of 10 pixels/mm, the image signal (initial image signal) obtained by sampling at 15 cycles/mm is reduced to ⅔. Reduction of the initial image signal to ⅔ generates an aliasing distortion component in a frequency band lower than 3 cycles/mm due to the aliasing distortion components generated in the aforesaid sampling. This is dealt with, for instance, in the following manner. That is, pixels whose values are 0 are inserted among the pixels of the initial image signal, thereby doubling the initial image signal. Thereafter the doubled initial image signal is reduced to ⅓ (i.e., re-sampled at 10 cycles/mm). Since the Nyquist frequency is 5 cycles/mm at this time, the component of 8 cycles/mm causes an aliasing distortion component of 2 cycles/mm, the component of 11 cycles/mm causes an aliasing distortion component of 1 cycle/mm (aliased at 5 cycles/mm and at 0 cycle/mm) and the component of 12 cycles/mm causes an aliasing distortion component of 2 cycles/mm (aliased at 5 cycles/mm and at 0 cycle/mm). Accordingly, the components of 8 cycles/mm, 11 cycles/mm and 12 cycles/mm are cut or reduced by carrying out a filtering processing before the aforesaid reduction to ⅓.

By processing the initial image signal, for instance, in the manner described above, the aliasing distortion components due to an image of a grid including therein harmonic components can be of a frequency not lower than 3 cycles/mm.

In accordance with a second aspect of the present invention, there is provided an image signal generating system comprising an image read-out means which reads out an original image including therein a predetermined periodic pattern by sampling the original image at a frequency higher than a desired sampling frequency and obtains an initial image signal and a re-sampling means which re-samples the initial image signal at the desired sampling frequency to generate a final image signal, wherein the final image signal is generated so that the aliasing distortion components due to the predetermined periodic pattern come to be of a frequency not lower than a predetermined frequency.

For example, the final image signal may be generated so that the aliasing distortion components due to the predetermined periodic pattern come to be of a frequency not lower than the predetermined frequency by arranging the image read-out means to sample the original image at a sampling frequency such that the aliasing distortion components come to be of a frequency not lower than the predetermined frequency.

Otherwise, the final image signal may be generated so that the aliasing distortion components due to the predetermined periodic pattern come to be of a frequency not lower than the predetermined frequency by carrying out on the initial image signal a filtering processing for filtering out, from the initial image signal, frequency components which causes aliasing distortion components in a frequency band lower than the predetermined frequency by the use of a filtering means and then re-sampling the resultant image signal at the desired sampling frequency by the re-sampling means.

In accordance with the present invention, since the final image signal is generated so that the aliasing distortion components due to the predetermined periodic pattern come to be of a frequency not lower than a predetermined frequency, the original image may be sampled at a relatively low frequency, and accordingly, the time required to generate an image signal can be shortened.

Further, when the final image signal is generated so that the aliasing distortion components due to the predetermined periodic pattern come to be of a frequency not lower than the predetermined frequency by carrying out on the initial image signal a filtering processing for filtering out, from the initial image signal, frequency components which causes aliasing distortion components in a frequency band lower than the predetermined frequency by the use of aforesaid filtering means and then re-sampling the resultant image signal at the desired sampling frequency by the re-sampling means, the filtering means need not remove all the harmonic components and accordingly, need not have a sharp attenuation characteristic, which reduces the cost.

DESCRIPTION OF THE PREFERRED EMBODIMENT

A radiation image read-out apparatus employing an image signal generating system in accordance with an embodiment of the present invention will be described with reference to the drawings, hereinbelow.

In this particular embodiment, the radiation image read-out apparatus reads out a radiation image recorded on a stimulable phosphor sheet 7 (FIG. 1) in the following manner.

Figure 1:
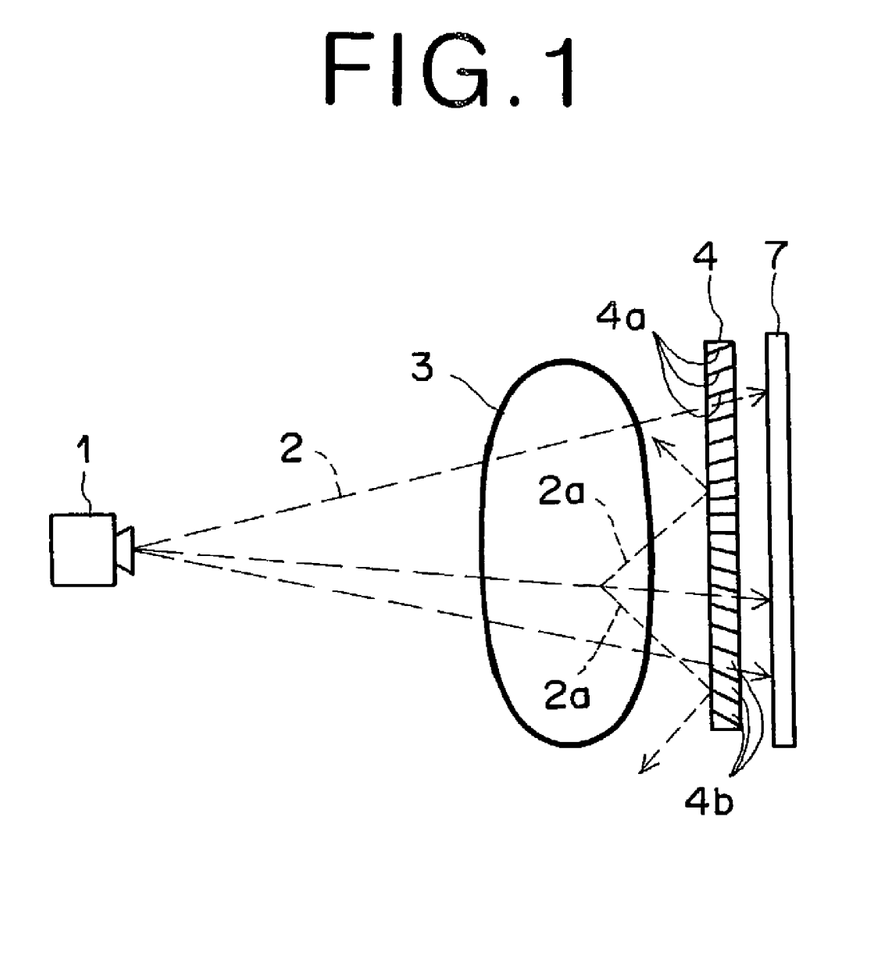
FIG. 1 is a schematic view showing an example of a radiation image taking apparatus.

In FIG. 1, a radiation 2 radiated from a radiation source 1 is projected onto a stimulable phosphor sheet 7 through an object 3 and a grid 4. The grid 4 comprises linear lead members 4a and linear aluminum members which are alternately arranged at pitches of 4/mm. The radiation 2 is cut by the lead members 4a and passes through the aluminum members 4b to be projected onto the stimulable phosphor sheet 7. Accordingly, an image of the grid 4 of 4/mm is recorded on the stimulable phosphor sheet 7 together with a radiation image of the object 3. Radiation 2a scattered in the object 3 obliquely impinges upon the grid 4 and accordingly is partly cut by the grid 4 and partly reflected by the grid 4, whereby the scattered radiation can hardly impinge upon the stimulable phosphor sheet 7 and a sharp radiation image is recorded on the stimulable phosphor sheet 7. The spatial frequency of the grid image is 4 cycles/mm.

Figure 2:
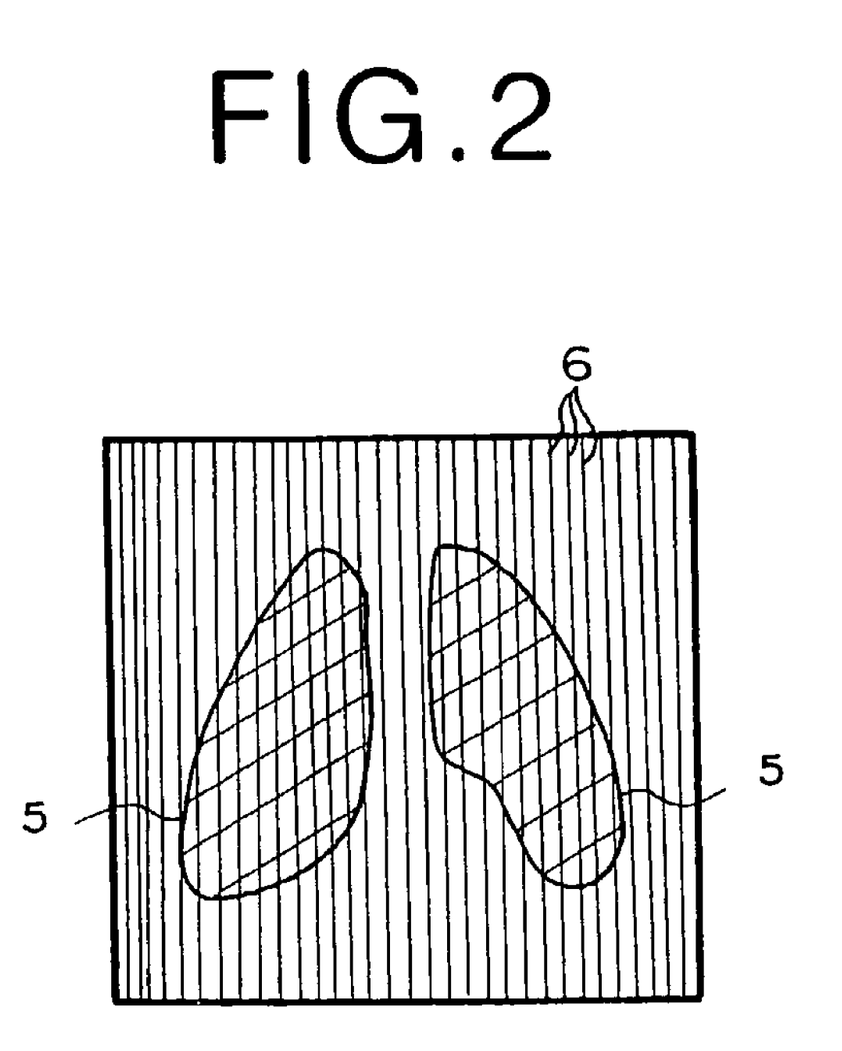
FIG. 2 is a view showing an example of a radiation image taken by the use of a grid.

FIG. 2 shows a radiation image recorded on the stimulable phosphor sheet 7 by the use of the grid 4, where an image 6 of the grid 4 (marked by the vertical stripes) is superposed on a radiation image 5 of the object 3 (marked by the oblique stripes).

The radiation image read-out apparatus will be described with reference to FIG. 3, hereinbelow.

Figure 3:
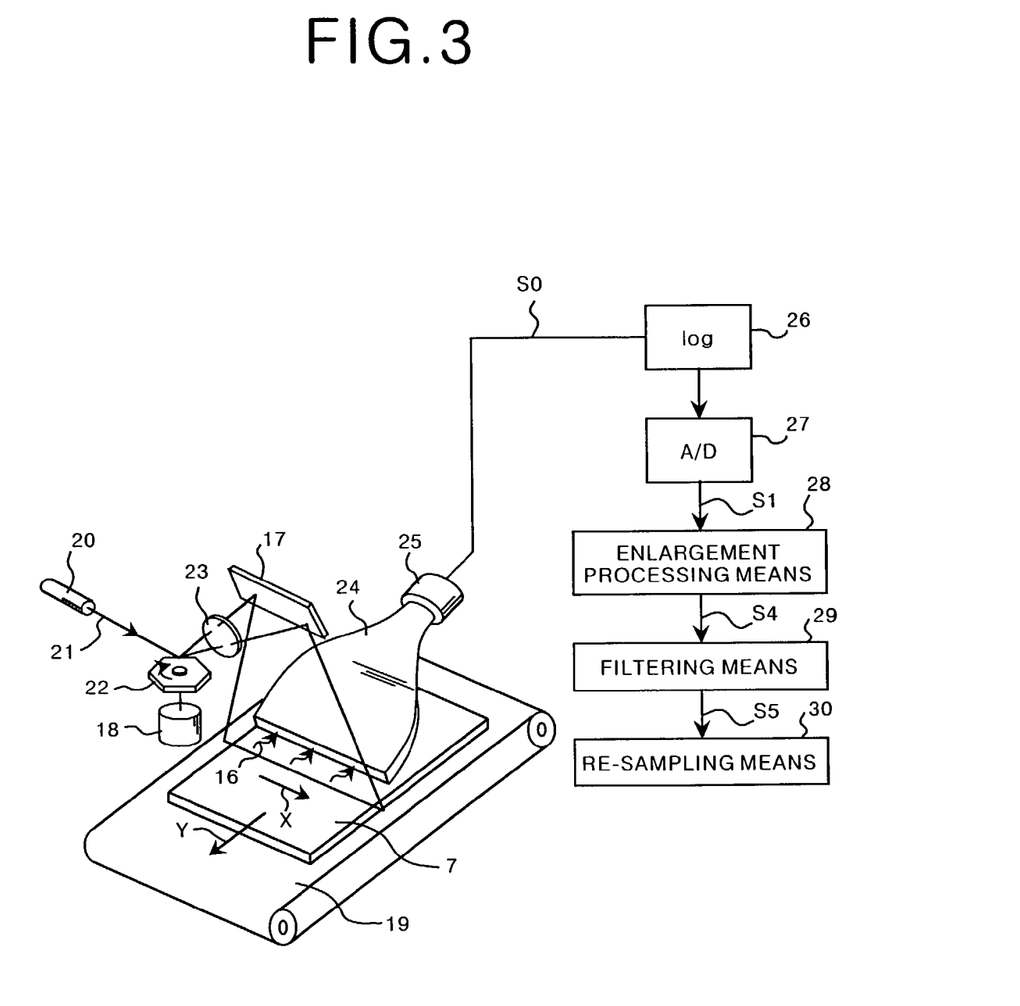
FIG. 3 is a schematic view showing a radiation image read-out apparatus employing an image signal generating system in accordance with an embodiment of the present invention.

In FIG. 3, the stimulable phosphor sheet 7 which has been exposed to the radiation 2 through the object 3 is conveyed by a sheet conveyor means 19 (which may be an endless belt) driven by a driving means (not shown) in the direction of arrow Y (sub-scanning). The stimulable phosphor sheet 7 is set on the sheet conveyor means 19 so that the stimulable phosphor sheet 7 is conveyed in perpendicular to the grid image 6. While the stimulable phosphor sheet 7 is being conveyed by the sheet conveyor means 19 in the direction of arrow Y, a laser beam 21 emitted from a laser 20 is caused to scan the stimulable phosphor sheet 7 in a main scanning direction (the direction of arrow X) substantially perpendicular to the sub-scanning direction by a scanning optical system comprising a rotary polygonal mirror 22 driven by a motor 18 to rotate at high speed in the direction of the arrow, a condenser lens 23 (which may be an fθ lens) and a mirror 17. In this particular embodiment, the sampling pitch upon reproduction of a radiation image is 10/mm (5 cycles/mm in Nyquist frequency) and the sampling pitches in the main scanning direction and the sub-scanning direction are 15 pixels/mm (7.5 cycles/mm in Nyquist frequency). The parts of the stimulable phosphor sheet 7 exposed to the laser beam 21 emit stimulated emission 16 in amounts proportional to the amounts of radiation energy stored therein. The stimulated emission 16 is led to a photomultiplier 25 by a light guide 24 and is photoelectrically detected by the photomultiplier 25, whereby the amounts of the stimulated emission 16 representing a radiation image of the object 3 are converted into an analog electric image signal S0. The analog image signal S0 is logarithmically amplified by a logarithmic amplifier 26 and then input into an A/D convertor 27.

Generation of the final image signal so that the aliasing distortion components due to spatial frequency components of a grid image including therein harmonic components come to be of a frequency not lower than a predetermined frequency in the radiation image read-out apparatus of this embodiment will be described, hereinbelow. In this particular embodiment, an image signal of a pixel density of 10 pixels/mm is generated so that the aforesaid aliasing distortion components come to be of a frequency not lower than 3 cycles/mm. This is because, in medical images, useful signal components are generally in a spatial frequency band lower than 3 cycles/mm and accordingly, noise in a frequency band not lower than 3 cycles/mm does hardly affect diagnosis.

Figure 4:
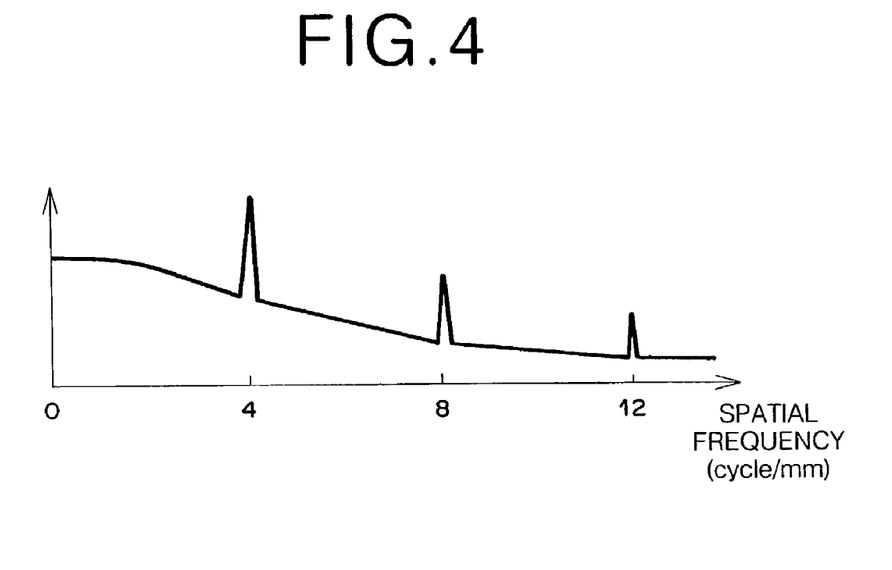
FIG. 4 is a view showing a frequency characteristic of an analog image signal obtained by reading a stimulable phosphor sheet on which a radiation image is recorded by the use of a grid of 4/mm.

The analog image signal S0 obtained by reading out an image recorded on the stimulable phosphor sheet 7 by the use of the grid 4 of 4/mm includes therein, in addition to a signal component of 4 cycles/mm representing an image of the grid 4, a second harmonic component thereof at 8 cycles/mm and a third harmonic component thereof at 12 cycles/mm (assuming that higher-order harmonic components are as small as negligible in response). In this case, the analog image signal S0 is as shown in FIG. 4 in its frequency characteristics.

Figure 5:
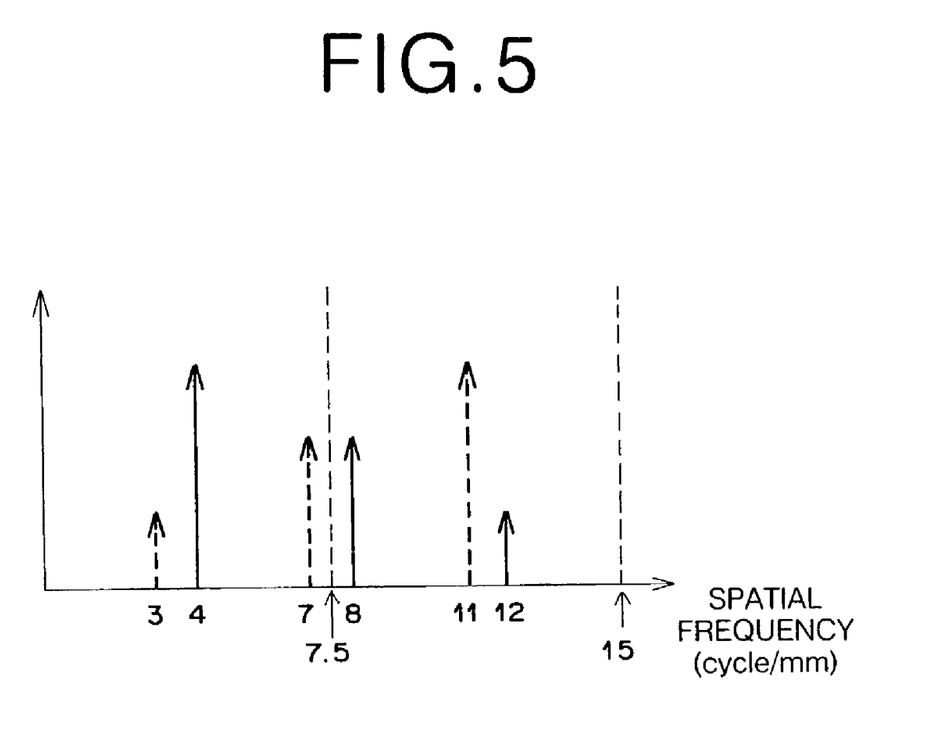
FIG. 5 is a view showing a frequency characteristic of an image signal obtained by sampling the analog image signal at a sampling frequency of 15 pixels/mm.

The A/D convertor 27 digitizes the analog image signal S0 by sampling it at a sampling frequency of 15 pixels/mm and outputs a digital image signal S1 to an enlargement processing means 28. The frequency characteristic of the digital image signal S1 output from the A/D convertor 27 is as shown in FIG. 5. In FIGS. 5, 7, 8, 10 and 11, only the spatial frequency components of the grid image, the harmonic components thereof and the aliasing distortion components are shown by arrows. Since the Nyquist frequency is 7.5 cycles/mm at this time, the spatial frequency component of 4 cycles/mm of the grid image causes an aliasing distortion component of 11 cycles/mm, the second harmonic component of 8 cycles/mm causes an aliasing distortion component of 7 cycles/mm and the third harmonic component of 12 cycles/mm causes an aliasing distortion component of 3 cycles/mm as shown in FIG. 5.

In order to obtain an image signal of 10 pixels/mm from the digital image signal S1 output from the A/D convertor 27, the image signal S1 is reduced to ⅔. Reduction of the image signal S1 to ⅔ is performed by first doubling the image signal S1, subjecting the doubled image signal to a filtering processing and then thinning the filtered image signal to ⅓ (reduction to ⅓).

The image signal S1 is input into an enlargement processing means 28 and the enlargement processing means 28 doubles the image signal S1 into an image signal S4 by inserting pixels whose values are 0 among the pixels of the image signal S1. This doubling processing is equivalent to re-sampling the image signal S1 at 30 pixels/mm and accordingly, the frequency characteristic is kept unchanged (is as shown in FIG. 5) though the Nyquist frequency changes to 15 cycles/mm.

Figure 6:
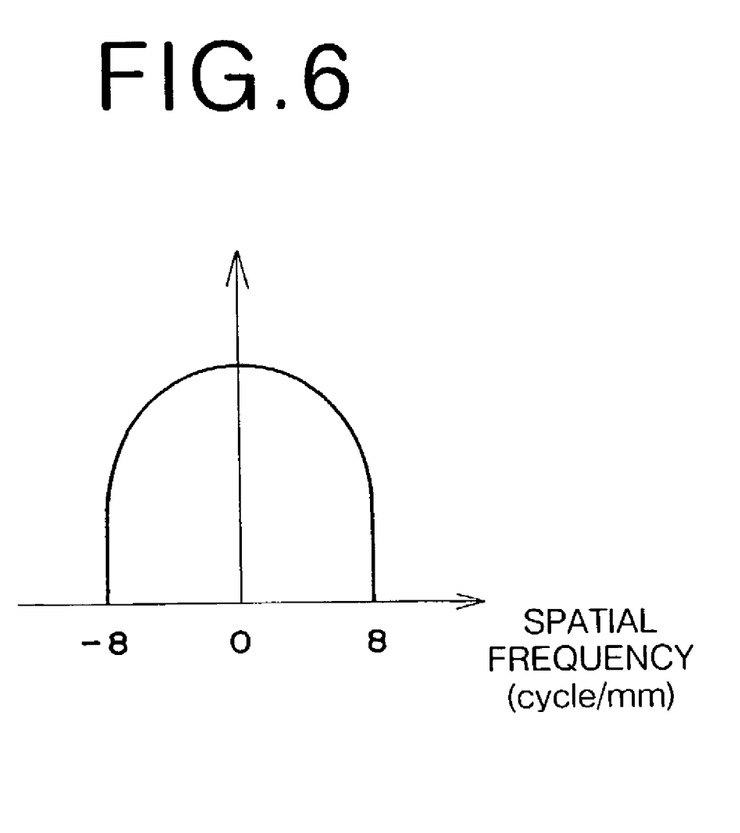
FIG. 6 is a view showing a characteristic of a filter for removing frequency components higher than 8 cycles/mm.
Figure 7:
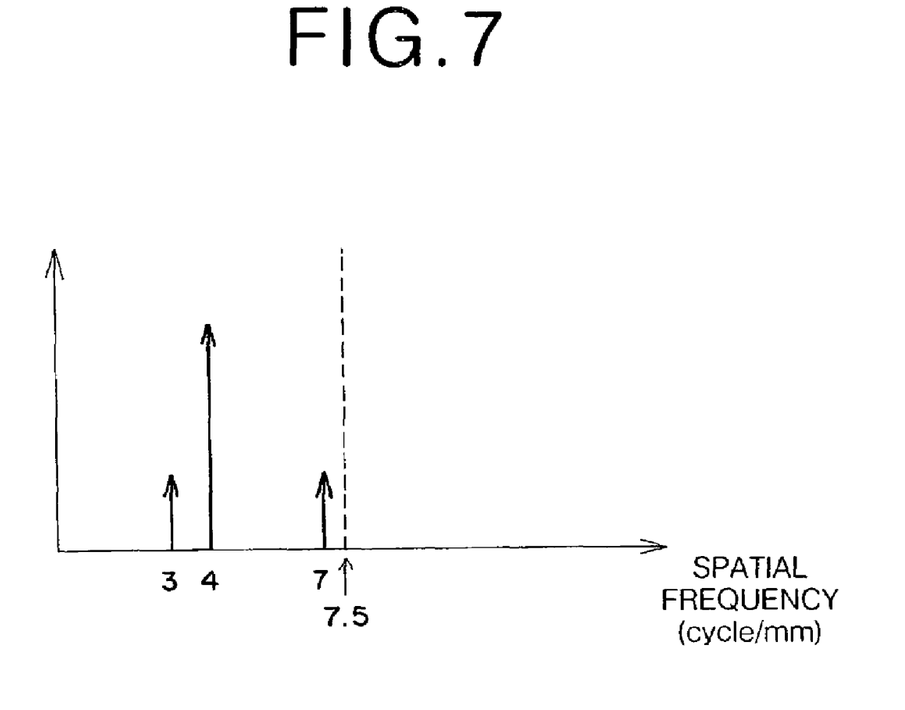
FIG. 7 is a view showing a frequency characteristic of an image signal obtained by carrying out a filtering processing by the use of the filter shown in FIG. 6.
Figure 8:
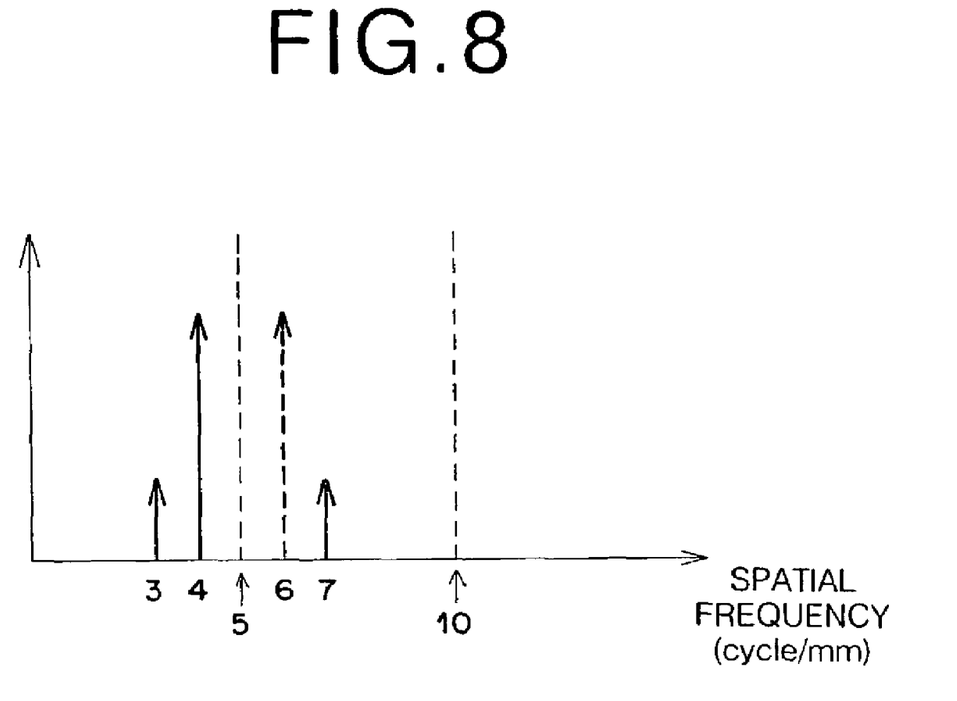
FIG. 8 is a view showing a frequency characteristic of an image signal obtained by re-sampling the image signal shown in FIG. 7.

The image signal S4 is input into a filtering means 29. The filtering means 29 carries out a filtering processing on the image signal S4 by the use of a filter having a frequency characteristic shown in FIG. 6, thereby removing frequency components not lower than 8 cycles/mm. This is because frequency components not lower than 8 cycles/mm causes aliasing distortion components lower than 3 cycles/mm upon re-sampling to be described later. The resultant image signal S5 (obtained by thus filtering the image signal S4) is as shown in FIG. 7 in frequency characteristic.

The image signal S5 output from the filtering means 29 is input into a re-sampling means 30. The re-sampling means 30 obtains an image signal of a pixel density of 10 pixels/mm by carrying out on the image signal S5 a ⅓ thinning processing, which is a thinning processing to thin pixels to ⅓ in both the main scanning direction and the sub-scanning direction so that the image is reduced to ⅓ of that represented by the image signal S5 and is equivalent to re-sampling at 10 cycles/mm (Nyquist frequency is 5 cycles/mm). At this time, though the frequency component of 4 cycles/mm causes an aliasing distortion component of 6 cycles/mm, generation of aliasing distortion component lower than 3 cycles/mm can be avoided.

Though, in the embodiment described above, the system is arranged to generate the final image signal so that the aliasing distortion components due to harmonic components of spatial frequency components of a grid image come to be of a frequency not lower than 3 cycles/mm, the system may be arranged to generate the final image signal so that the aliasing distortion components due to harmonic components of spatial frequency components of a grid image come to be of a frequency not lower than 2 cycles/mm.

Figure 9:
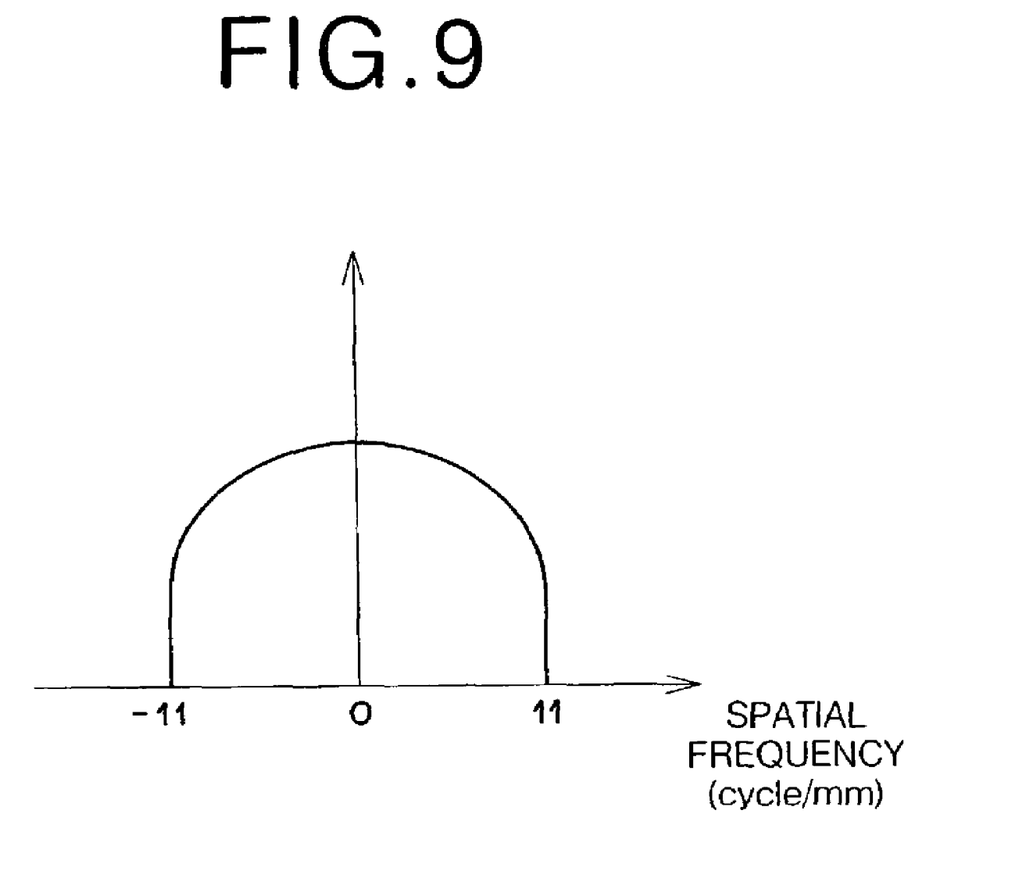
FIG. 9 is a view showing a characteristic of a filter for removing frequency components higher than 11 cycles/mm.
Figure 10:
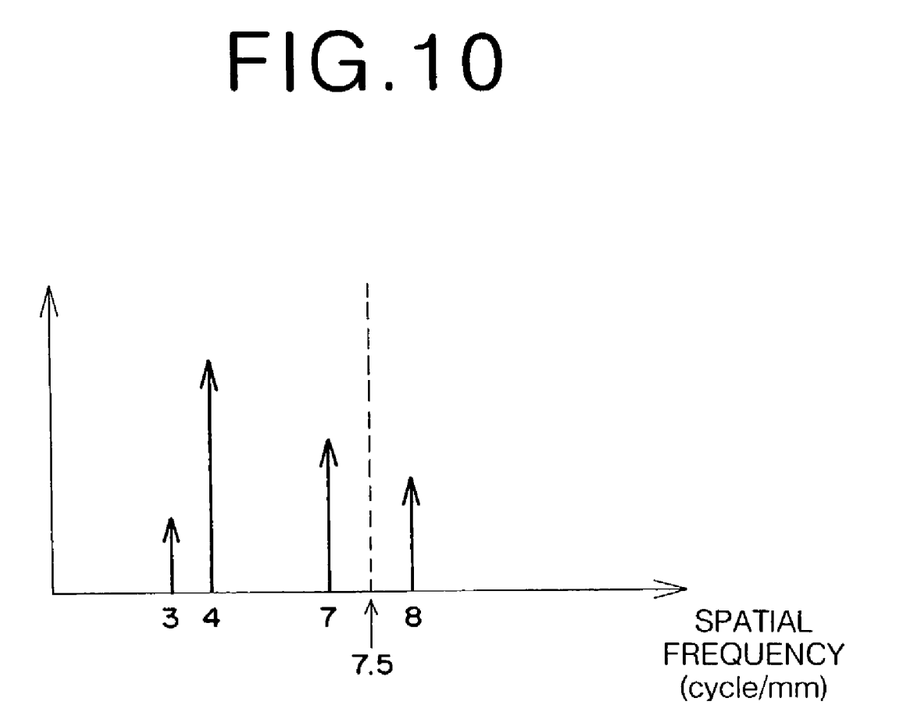
FIG. 10 is a view showing a frequency characteristic of an image signal obtained by carrying out a filtering processing by the use of the filter shown in FIG. 9.
Figure 11:
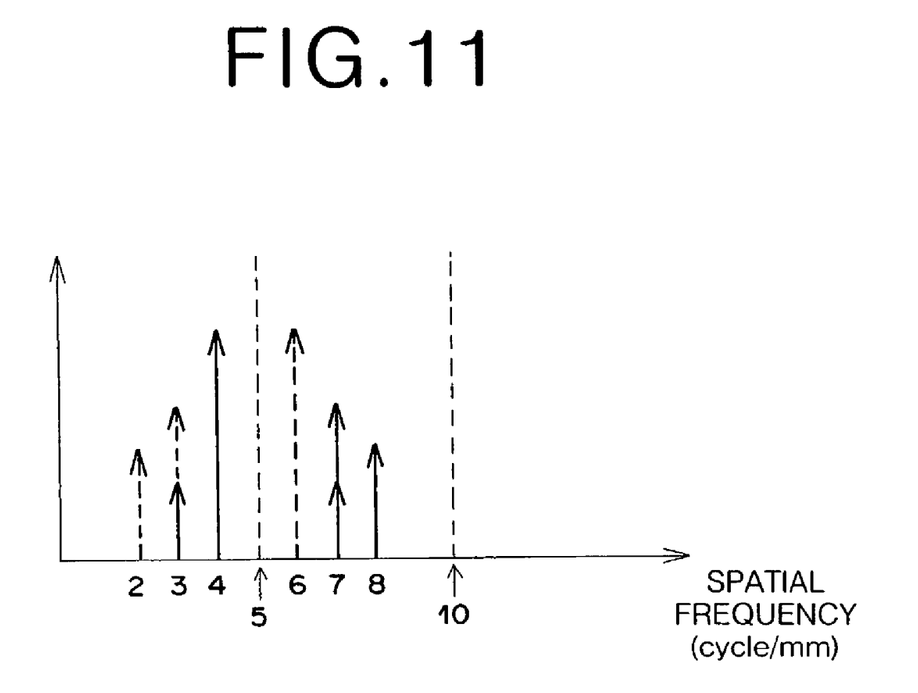
FIG. 11 is a view showing a frequency characteristic of an image signal obtained by re-sampling the image signal shown in FIG. 10.

In this case, frequency components not lower than 11 cycles/mm are removed by filtering by the use of a filter which is as shown in FIG. 9 in its frequency characteristics. The resultant image signal S5 is as shown in FIG. 10 in its frequency characteristics. Then by subjecting the image signal S5 to a ⅓ thinning processing by the re-sampling means 30, an image signal of a pixel density of 10 pixels/mm is obtained. At this time, though the frequency component of 4 cycles/mm causes an aliasing distortion component of 6 cycles/mm, the frequency component of 3 cycles/mm causes an aliasing distortion component of 7 cycles/mm, the frequency component of 7 cycles/mm causes an aliasing distortion component of 3 cycles/mm, and the frequency component of 8 cycles/mm causes an aliasing distortion component of 2 cycles/mm, generation of aliasing distortion component lower than 2 cycles/mm can be avoided.

Though the present invention has been described in conjunction with a grid whose pitch is 4/mm, the present invention can be applied to an image taken by the use of a grid having any pitch higher than 3.4/mm. For example, in the case where response of frequency components not lower than 12 cycles/mm is as small as negligible, by obtaining an initial image signal by sampling at 15 pixels/mm, doubling the initial image by inserting pixels of 0 value in the same manner described above, filtering the resultant image signal to remove frequency components not lower than 7 cycles/mm and then subjecting the filtered image signal to a ⅓ thinning processing, generation of aliasing distortion component lower than 3 cycles/mm can be avoided for frequency components of the grid having any pitch higher than 3.4/mm.

Further, by filtering the re-sampled image filter in the embodiment described above by the use of a low-pass filter which cuts frequencies in a predetermined range, an image removed with the grid image can be generated.

Though, in the embodiment described above, the original image is obtained by reading out an image recorded on a stimulable phosphor sheet, the original image may be obtained directly from a solid state image sensor or the like. In this case, the step of converting the amount of radiation (including light or an electrostatic latent image generated upon exposure to a radiation) to an electric signal corresponds to "sampling" and the steps of re-sampling the electric signal corresponds to "re-sampling".

In accordance with the embodiment described above, since the final image signal is generated so that the aliasing distortion components due to the grid image including harmonic components come to be of a frequency not lower than a predetermined frequency, the original image may be sampled at a relatively low frequency, and accordingly, the time required to generate an image signal can be shortened. Further, since the filtering processing need not remove all the harmonic components, the filter need not have a sharp attenuation characteristic, which reduces the cost.

What is claimed is:

1. An image signal generating method in which an original image including therein a predetermined periodic pattern is read out by sampling the original image at a frequency higher than a desired sampling frequency, thereby obtaining an initial image signal and the initial image signal is re-sampled at the desired sampling frequency to generate a final image signal, comprising:
   generating the final image signal so that aliasing distortion components therein due to high frequency components corresponding to the predetermined periodic pattern come to be of a frequency not lower than a predetermined frequency,
   wherein the initial image signal includes at least one harmonic of a frequency corresponding to the predetermined periodic pattern, and
   wherein the original image is a radiation image taken by the use of a grid, the predetermined periodic pattern is an image of the grid, and said predetermined frequency is 3 cycles/mm.

2. An image signal generating method as defined in claim 1 in which the final image signal is generated so that the aliasing distortion components due to the predetermined periodic pattern come to be of a frequency not lower than the predetermined frequency by sampling the original image at a sampling frequency such that the aliasing distortion components come to be of a frequency not lower than the predetermined frequency.

3. An image signal generating method as defined in claim 1 in which the final image signal is generated so that the aliasing distortion components due to the predetermined periodic pattern come to be of a frequency not lower than the predetermined frequency by carrying out on the initial image signal a filtering processing for filtering out, from the initial image signal, frequency components which cause aliasing distortion components in a frequency band lower than the predetermined frequency to produce a resultant image signal and then re-sampling the resultant image signal at the desired sampling frequency.

4. An image signal generating method as defined in claim 1, wherein the grid of the claimed invention comprises linear members of a radiation-untransmissible material and linear members of a radiation-transmissible material, which are alternately arranged at a fine pitch.

5. The image signal generating method as defined in claim 1, wherein the original image is a radiation image taken by the use of a grid, the predetermined periodic pattern is an image of the grid, and said predetermined frequency is 2 cycles/mm.

6. The image signal generating method as defined in claim 1, wherein the at least one harmonic is a plurality of harmonics.

7. The image signal generating method as defined in claim 1, wherein the original image comprises a radiation image.

8. The image signal generating method as defined in claim 1, wherein the final image is displayed as a visible image on a display.

9. An image signal generating system, comprising:
   an image read-out means which reads out an original image including therein a predetermined periodic pattern by sampling the original image at a frequency higher than a desired sampling frequency and obtains an initial image signal; and
   a re-sampling means which re-samples the initial image signal at the desired sampling frequency to generate a final image signal,
   wherein the final image signal is generated so that the aliasing distortion components therein due to high frequency components corresponding to the predetermined periodic pattern come to be of a frequency not lower than a predetermined frequency, and
   wherein the initial image signal includes at least one harmonic of a frequency corresponding to the predetermined periodic pattern, and
   wherein the original image is a radiation image taken by the use of a grid, the predetermined periodic pattern is an image of the grid, and said predetermined frequency is 3 cycles/mm.

10. An image signal generating system as defined in claim 9 in which the image read-out means is arranged to sample the original image at a sampling frequency such that the aliasing distortion components come to be of a frequency not lower than the predetermined frequency, whereby the final image signal is generated so that the aliasing distortion components due to the predetermined periodic pattern come to be of a frequency not lower than the predetermined frequency.

11. An image signal generating system as defined in claim 9 in which a filtering means for carrying out on the initial image signal a filtering processing for filtering out, from the initial image signal, frequency components which cause aliasing distortion components in a frequency band lower than the predetermined frequency to produce a resultant image signal and the re-sampling means re-samples the resultant image signal at the desired sampling frequency, whereby the final image signal is generated so that the aliasing distortion components due to the predetermined periodic pattern come to be of a frequency not lower than the predetermined frequency.

12. The image signal generating system as defined in claim 9, wherein the original image is a radiation image taken by the use of a grid, the predetermined periodic pattern is an image of the grid, and said predetermined frequency is 2 cycles/mm: and wherein the grid of the claimed invention comprises linear members of a radiation-untransmissible material and linear members of a radiation-transmissible material, which are alternately arranged at a fine pitch.

13. The image signal generating system as defined in claim 9, wherein the at least one harmonic is a plurality of harmonics.

14. The image signal generating system as defined in claim 9, wherein the original image comprises a radiation image.

15. The image signal generating system as defined in claim 9, wherein the final image is displayed as a visible image on a display.

* * * * *